United States Patent [19]

Joo

[11] Patent Number: 4,633,645

[45] Date of Patent: Jan. 6, 1987

[54] PACKAGING MACHINE

[75] Inventor: Katsuhiro Joo, Tokushima, Japan

[73] Assignee: Shikoku Kakooki Co., Ltd., Tokushima, Japan

[21] Appl. No.: 514,234

[22] Filed: Jul. 15, 1983

[30] Foreign Application Priority Data

Jul. 15, 1982 [JP] Japan .................. 57-123940

[51] Int. Cl.⁴ .......................................... B65B 55/10
[52] U.S. Cl. ............................................ 53/282; 53/368
[58] Field of Search ................. 53/167, 131, 137, 282, 53/425, 368, 426; 198/495

[56] References Cited

U.S. PATENT DOCUMENTS

| | | | |
|---|---|---|---|
| 2,957,289 | 10/1960 | Monroe et al. | 53/131 X |
| 3,025,648 | 3/1962 | Eichelman et al. | 53/137 |
| 3,566,575 | 3/1971 | Lisiecki | 53/426 |
| 3,694,997 | 10/1972 | Christine et al. | 53/167 X |
| 3,766,709 | 10/1973 | Zausner | 53/167 |
| 3,783,581 | 1/1974 | Pierce | 53/167 X |
| 3,911,640 | 10/1975 | Rausing | 53/167 X |
| 3,942,299 | 3/1976 | Bory | 53/167 X |
| 4,151,698 | 5/1979 | Müller et al. | 53/131 |
| 4,391,080 | 7/1983 | Brody et al. | 53/167 X |
| 4,409,775 | 10/1983 | Brody et al. | 53/167 |

FOREIGN PATENT DOCUMENTS

2120765  8/1972  France .................. 53/167
123282   8/1979  Japan .

Primary Examiner—E. R. Kazenske
Assistant Examiner—Michael D. Folkerts
Attorney, Agent, or Firm—Armstrong, Nikaido, Marmelstein & Kubovcik

[57] ABSTRACT

A packaging machine comprising a closed main chamber enclosing a container transport conveyor in its entirety, a closed rear chamber disposed in communication with the main chamber and enclosing a container forming-feeding unit in its entirety, and a group of units including a filling unit, a capping unit, a sealing unit, a marking unit and a container discharge unit which are arranged in series on the top wall of the main chamber from a rear portion thereof toward the front. The group of units have portions operative on containers and extending into the main chamber. Cleaners for cleaning the conveyor, etc. are arranged at required locations within the main chamber.

5 Claims, 13 Drawing Figures

PACKAGING MACHINE

The present invention relates to a packaging machine, and more particularly to a machine for feeding containers to a conveyor, filling the containers with fluid food or like contents while the containers are being transported by the conveyor, thereafter hermetically capping the containers and finally discharging the filled containers from the conveyor.

Generally, machines for handling foods must be under stringent hygienic control. For this purpose, it is desirable to install such a machine in a chamber which is sterilized in its entirety, but this requires a very high equipment cost.

An object of the present invention is to provide a packaging machine in which a minimized space required is sealed off from the atmosphere to perform a packaging operation within the space and assure hygiene at a low cost.

The present invention provides a packaging machine comprising a closed main chamber enclosing a container transporting conveyor in its entirety, a closed rear chamber disposed in communication with the main chamber and enclosing a container forming-feeding unit in its entirety, and a group of units including at least a filling unit, a capping unit and a container discharge unit which are arranged in series on the top wall of the main chamber from a rear portion thereof toward the front, the group of units having portions operative on containers and extending into the main chamber. The machine assures a hygienic packaging operation at a low cost.

With reference to the drawings, an embodiment of the invention will be described below for illustrative purposes only.

Figure 1:
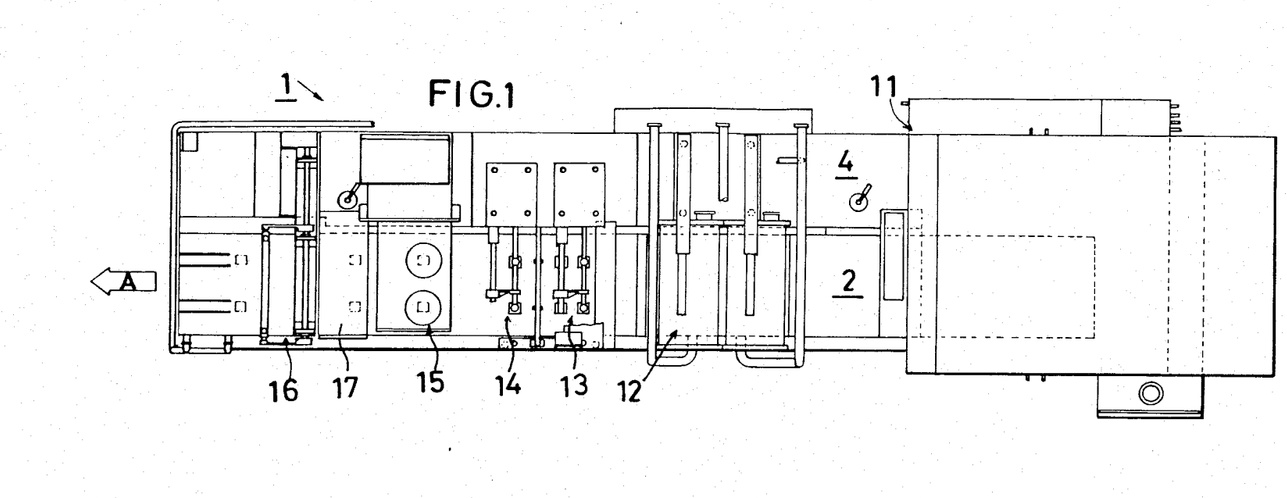
FIG. 1 and FIG. 2 are a plan view and a side elevation, respectively, showing a packaging machine according to the present invention.
Figure 2:
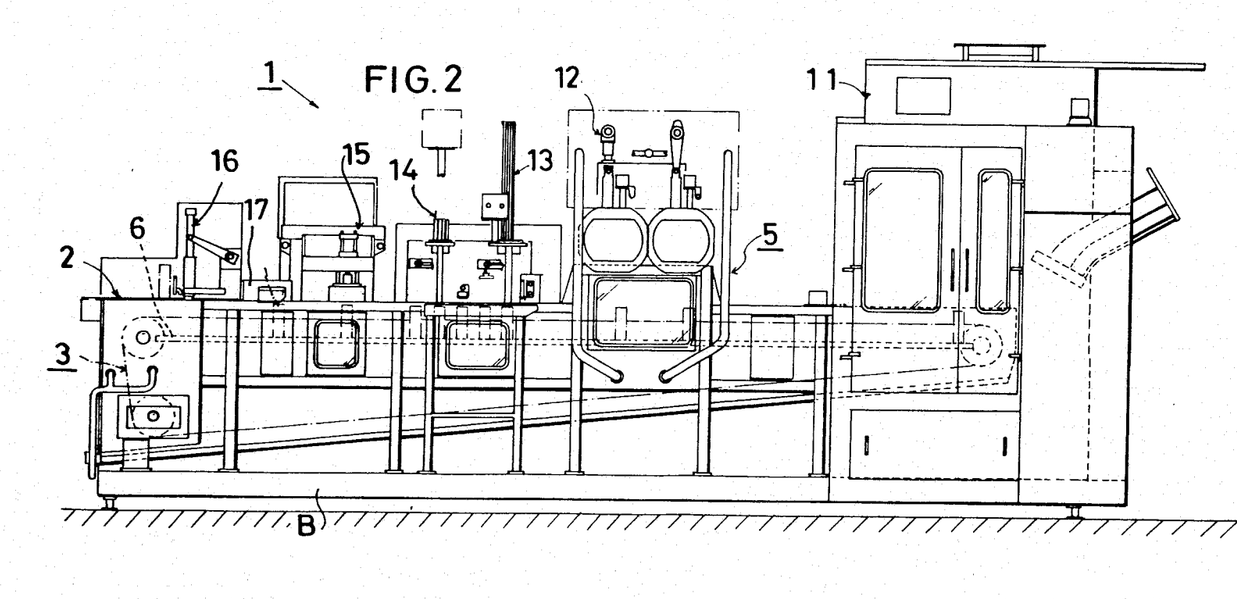

FIGS. 1 and 2 show a packaging machine in its entirety. The packaging machine comprises a closed main chamber 2 enclosing a container transport conveyor 3 in its entirety, a closed rear chamber 11 disposed in communication with the main chamber 2 and enclosing a container forming-feeding unit in its entirety, and a group of units, 1, including a filling unit 12, capping unit 13, labelling unit 14, sealing unit 15, marking unit 17 and container discharge unit 16 which are arranged on the top wall of the main chamber 2 in series from a rear portion thereof toward the front, i.e., in the direction of transport of containers C as indicated by arrow A in FIG. 1. The group of units, 1, have portions operative on the containers C and extending into the main chamber 2. Although not shown, the container forming-feeding unit is such as the one disclosed in Published Japanese Utility Model Publication No. 57-46245/82 (Kokai No. 123282/1979). A subchamber 4 provided alongside the main chamber 2 accommodates drive means (not shown) for driving the container transport conveyor 3 and the group of units 1 in operative relation. The group of units 1 and the drive means are those already known. Chiefly accommodated in the main chamber 2 are rails 6 for guiding the containers C at their bottom with the movement of the conveyor 3, and the cleaning means 5, in addition to the conveyor 3.

Parallelepipedal containers C of three different heights are available. With different heights, such containers have three different capacities of 250 ml, 500 ml and 1000 ml. The rails 6 are raised or lowered in accordance with the height of the containers C to be transported, such that containers of different kinds are positioned at a constant level at their upper ends.

Figure 3:
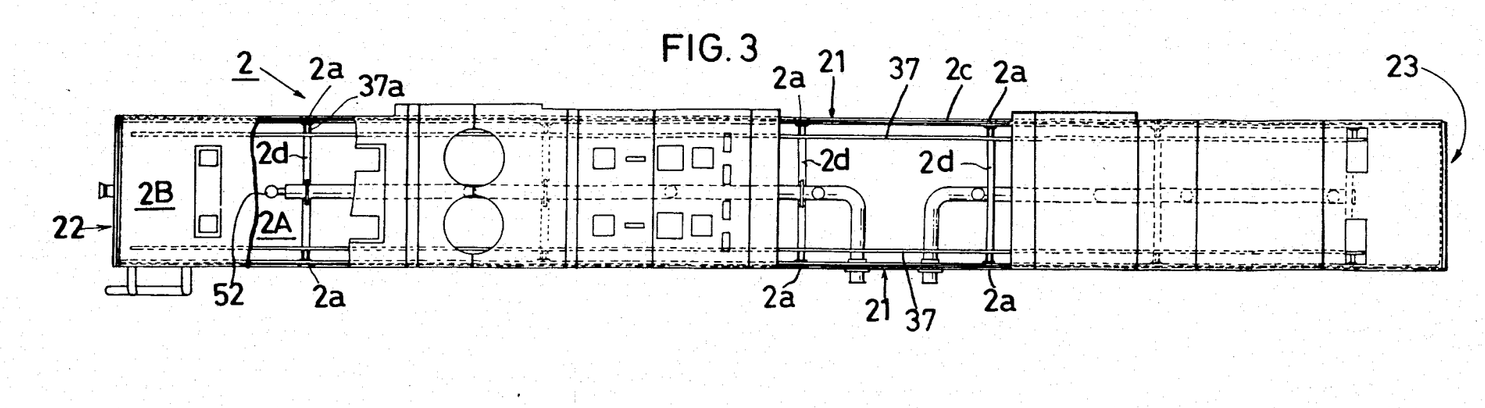
FIG. 3 and FIG. 4 are a plan view and a side elevation, respectively, showing a main chamber as partly broken away.
Figure 4:
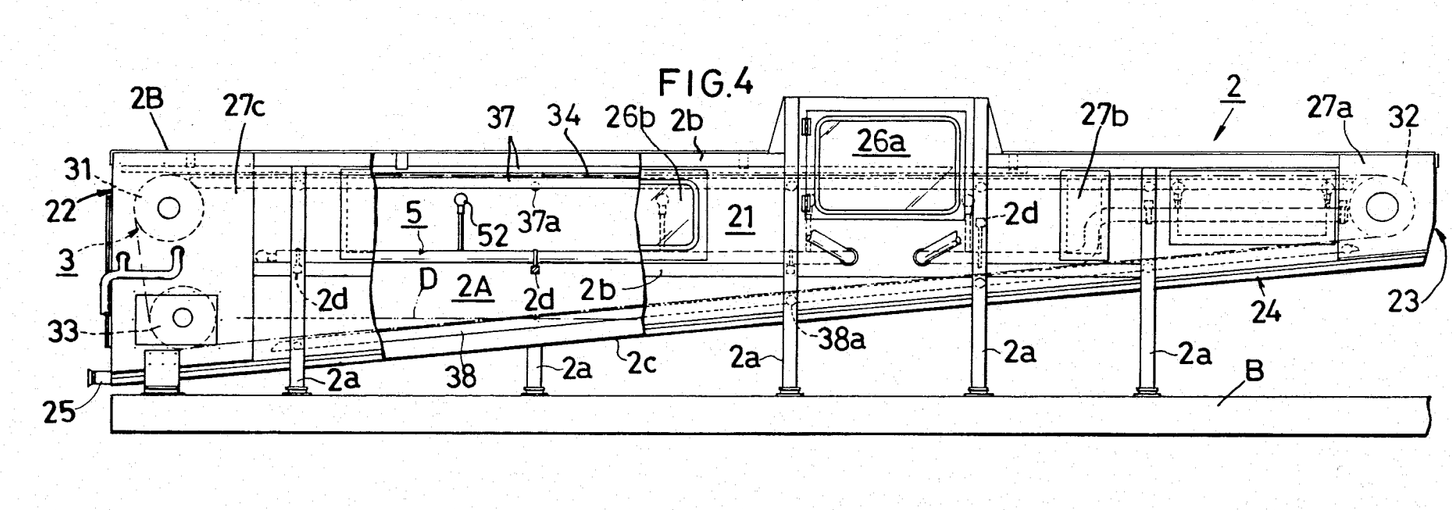

FIGS. 3 and 4 show the main chamber 2 in greater detail. The main chamber 2 comprises a substantially box-shaped main body 2A which is open at its top and which is in the form of a rectangle elongated in front-to-rear direction when seen in plan view, and a top wall 2B secured to the main body 2A for closing the opening. The top wall 2B is formed with apertures for inserting therethrough the portions of the group of units, 1, extending into the main chamber 2. After the group of units 1 have been installed on the top wall 2B, the remaining clearances in the apertures are hermetically closed by suitable means. The main body 2A is made up of a frame composed of upright posts 2a on a bed B and beams 2b, and plates 2c provided inside the frame. The main body 2A has opposite side walls 21, front and rear walls 22, 23 and a bottom wall 24. Each pair of opposed posts 2a are interconnected by a horizontal bar 2d. The bottom wall 24 is slanted forwardly downward. Thus the depth of the interior of the main body 2a increases toward the front. A drain pipe 25 is horizontally attached to the lower end of the front wall 22. The side walls 21 have inspection windows 26a, 26b and reinforcing members 27a, 27b, 27c at required locations.

Figure 7:
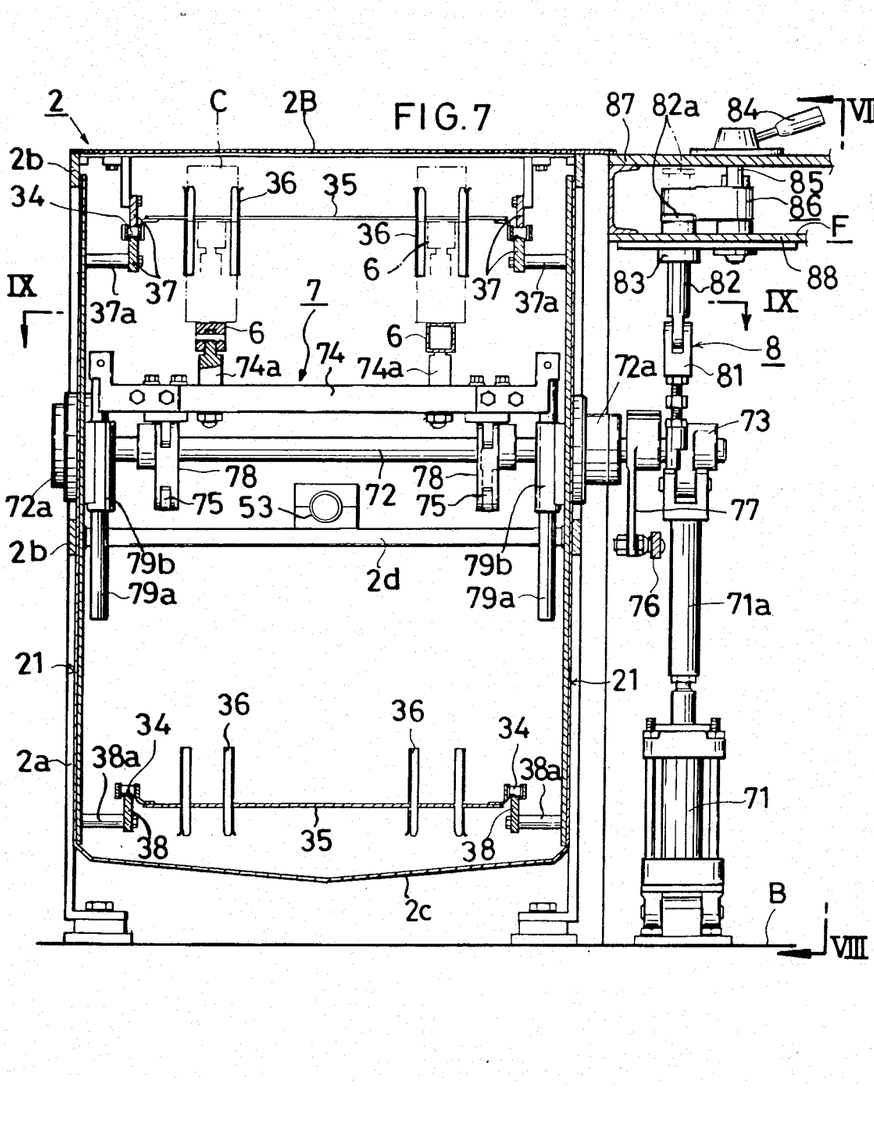
FIG. 7 is an enlarged view in vertical cross section of the main chamber for showing a rail lifting assembly.
Figure 8:
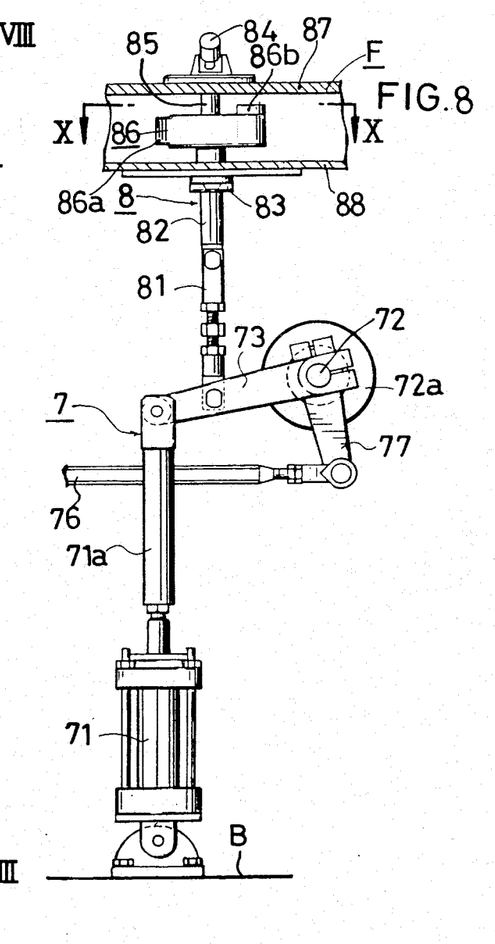
FIG. 8 and FIG. 9 are views in section taken along the line VIII—VIII and the line IX—IX, respectively, in FIG. 7.
Figure 13:
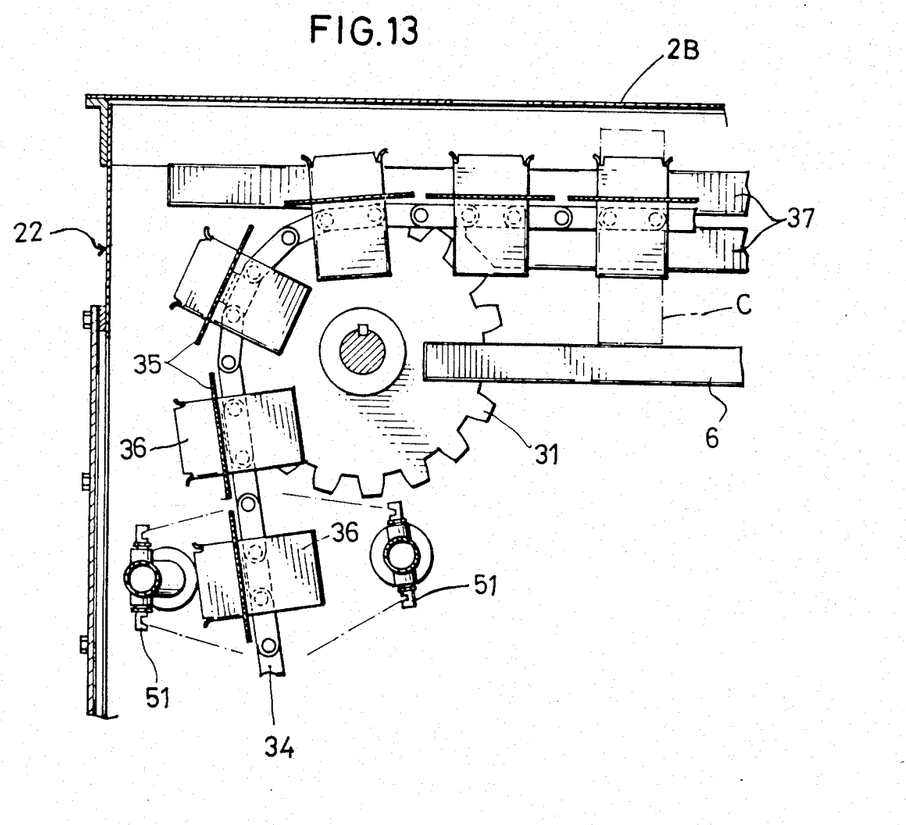

With reference to FIG. 3 and further to FIGS. 7 and 13, the container transport conveyor 3 comprises a pair of opposed endless chains 34, a multiplicity of slats 35 extending between and attached to the chains 34 and having container holders 36, drive front sprockets 31, driven rear sprockets 32 and lower sprockets 33 disposed below the front sprockets 31 and arranged close to the slanting lower end of the bottom wall 24, the endless chains 34 being reeved around the sprockets 31 to 33. The upper and lower sections of the chains 34 are provided with chain guides 37 and 38, respectively, which are attached to the side walls 21 by brackets 37a and 38a. The container holder 36 comprises a pair of vertical pieces positionable along the side walls of the rectangular parallelepipedal container C and bent in corresponding relation to the front and rear corners of the container C. The holder 36 restrains the container C from moving horizontally but permits it to move vertically.

Figure 5:
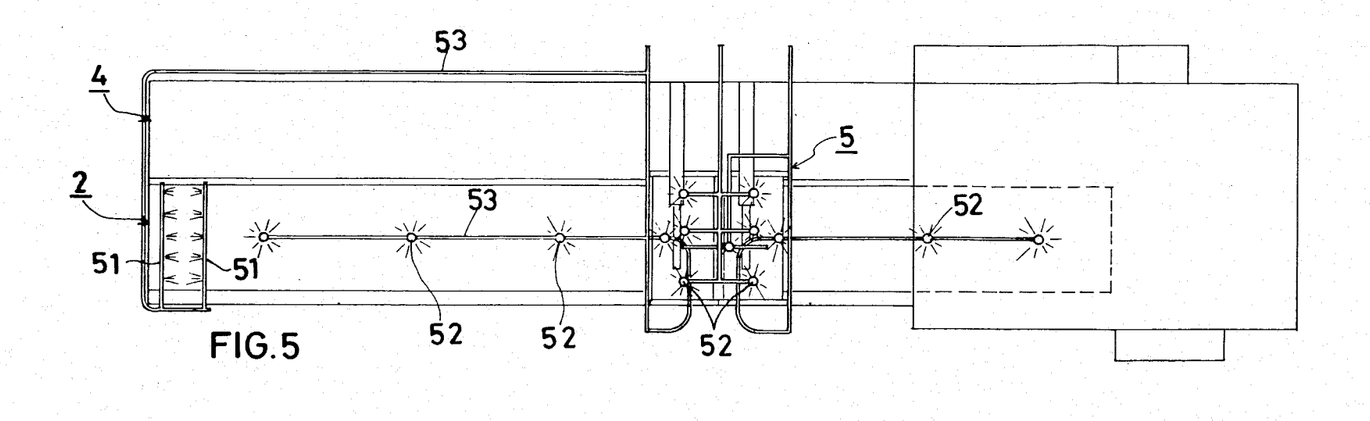
FIG. 5 and FIG. 6 are a plan view and a side elevation, respectively, showing the arrangement of cleaning means within the main chamber.
Figure 6:
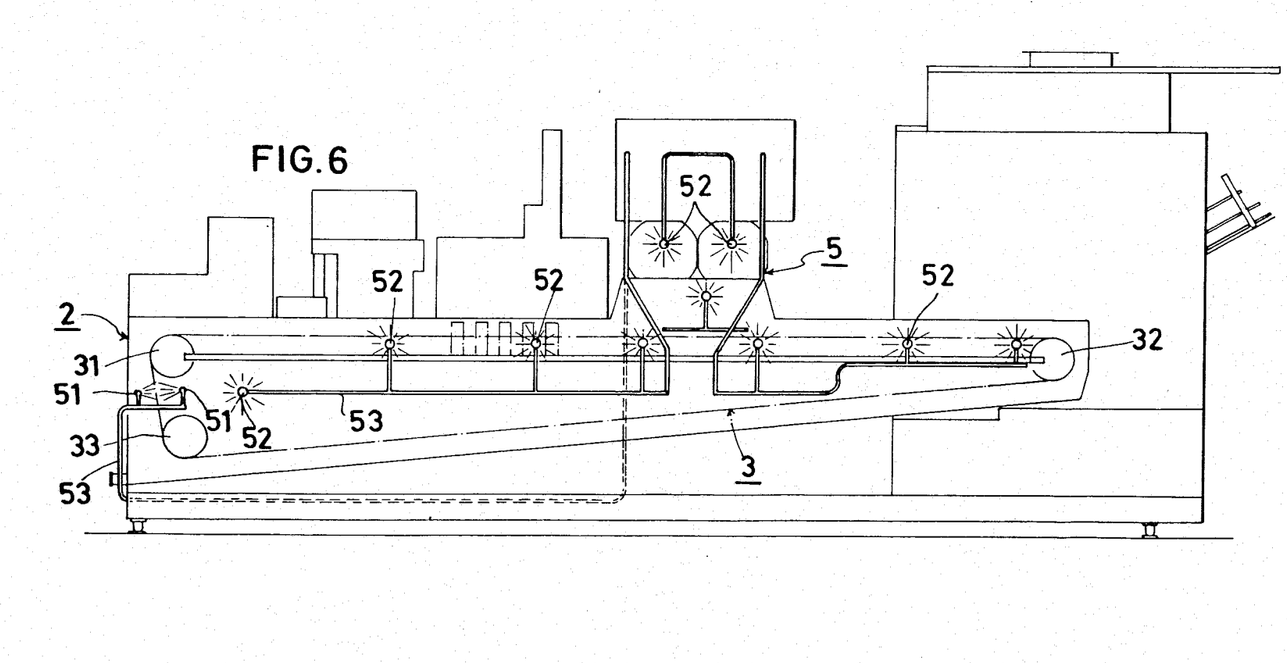
Figure 12:
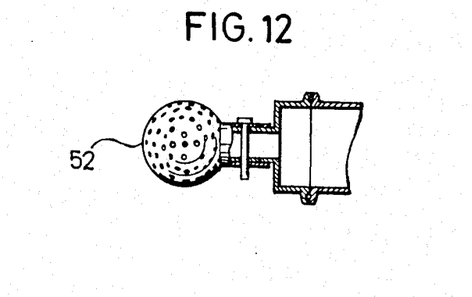
FIG. 12 and FIG. 13 are enlarged side elevations showing a spray ball and spray nozzles, respectively, of the cleaning means.

FIGS. 5 and 6 show the arrangement of the cleaning means 5. A pair of opposed front and rear first spray nozzles 51 is disposed between the front sprockets 31 and the lower sprockets 33 within the main chamber 2 for spraying a washing liquid against the slats 35 and holders 36 from the front and rear sides thereof when they pass between the nozzles 51. FIG. 13 shows the spray nozzles 51 in detail. Second spray balls 52 are arranged slightly below the upper section of the conveyor 3 at a predetermined spacing and also at a small distance rearward from the front portion of the conveyor. Some second spray balls 52 are further arranged within the casing of the filling unit 12 outside the main chamber 2. FIG. 12 shows the spray ball 52 in detail. Indicated at 53 are pipes for supplying the washing liquid to the nozzles 51 and balls 52.

FIGS. 7 to 11 show a rail lifting assembly 7. This assembly 7 chiefly comprises a hydraulic cylinder 71 provided with means 8 for adjusting the level of the rails 6, a rotatable shaft 72 extending transversely through the main chamber 2 and having one end projecting outward from the chamber 2, a first arm 73 having an upper end secured to the projecting end of the rotatable shaft 72 and a lower end pivoted to the piston rod 71a of the cylinder 71, second arms 75 each having one end pivoted to a link 78 attached to the lower side of a horizontal lift bar 74 and the other end secured to the rotatable shaft 72, and connecting members 74a extending upward from the lift bar 74 and connected to the rails 6. The hydraulic cylinder 71 is pivoted to the base B and oriented upward at one side of the main chamber 2. The rotatable shaft 72 and another rotatable shaft 72 having similar members are arranged at two locations spaced apart longitudinally of the conveyor. The shafts 72 are supported by bearings 72a on the side walls 21. The front and rear rotatable shafts 72 are made rotatable in the same direction at the same time by downward third arms 77 secured to their projecting ends and interconnected by a horizontal link 76.

The rails 6 are disposed below and in parallel with the upper paths of travel of the container holders 36 for supporting the bottoms of the containers retained by the holders and guiding the containers. The horizontal lift bars 74 extend in parallel with the rotary shafts 72 and at right angles to the rails 6. The bars 74 are fixedly provided at their opposite ends with guide rods 79a extending downward and slidably inserted through tubular guide members 79b on the side walls.

Figures 9, 10:
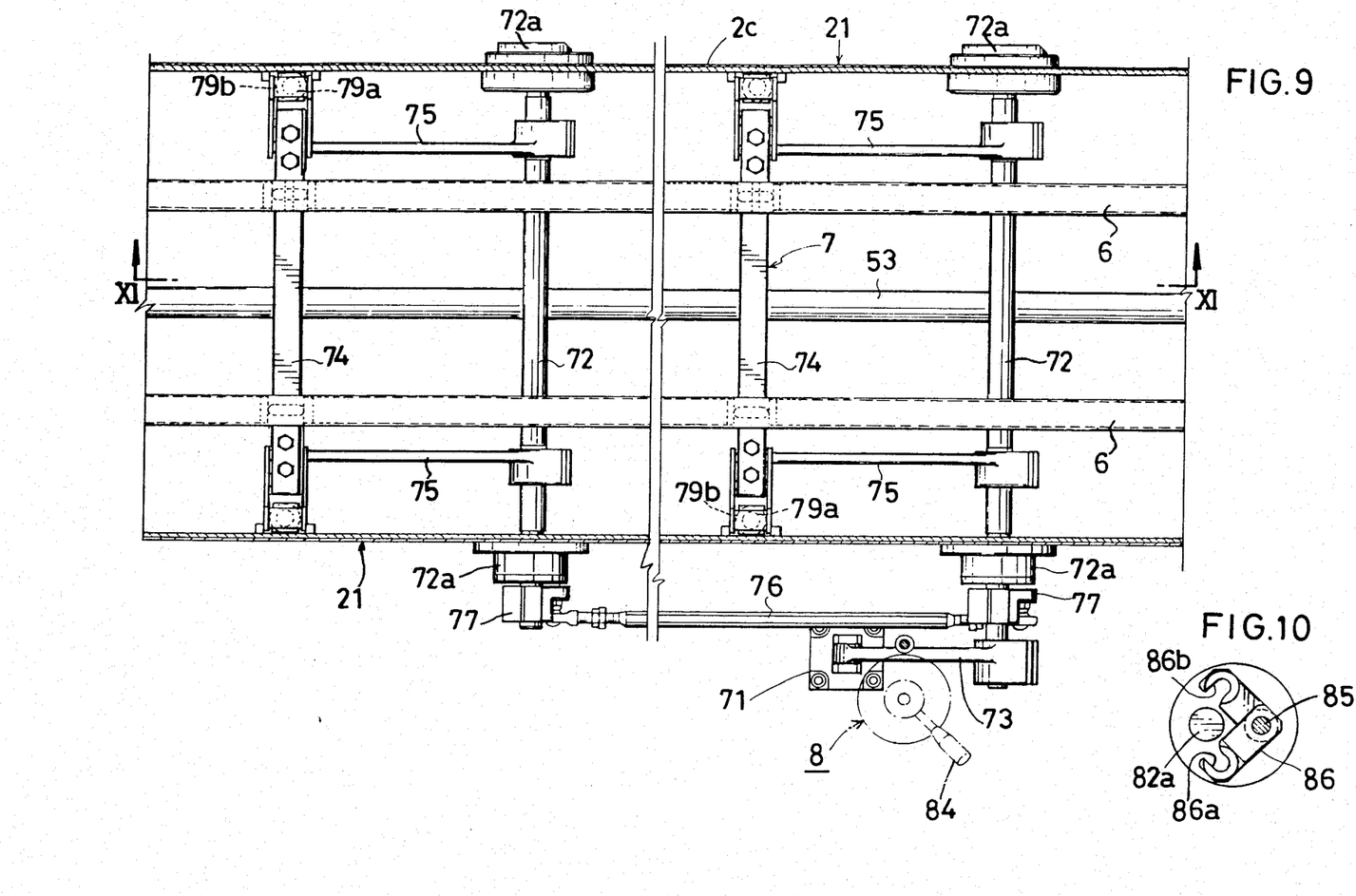
FIG. 10 is a view in section taken along the line X—X in FIG. 8.
Figure 11:
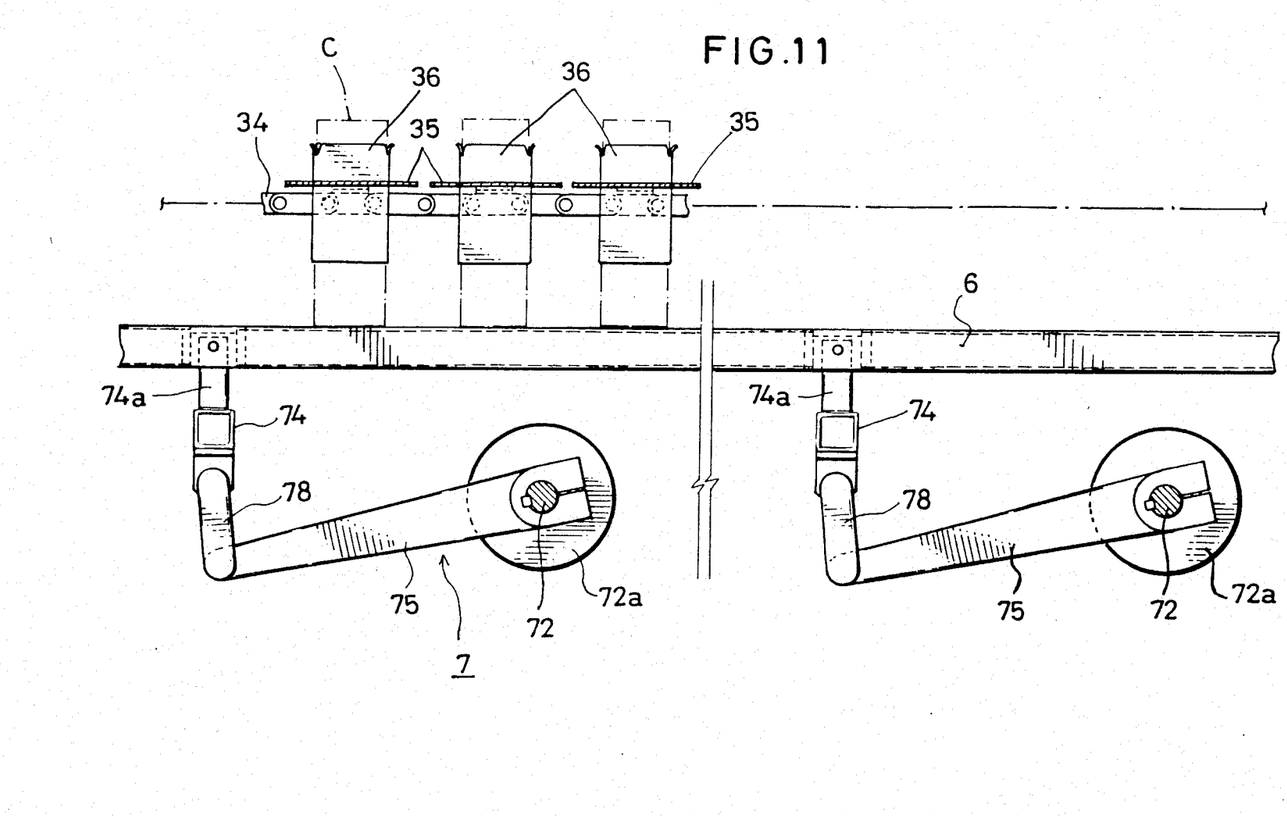
FIG. 11 is a view in section taken along the line XI—XI in FIG. 9.

The rail level adjusting means 8 regulates the stroke of the piston rod 71a of the hydraulic cylinder 71 by way of the first arm 73 to position the rails at a predetermined level. A lift rod 82 is connected at its lower end to an intermediate portion of the first arm 73 by an upwardly extending link 81. Two horizontal parallel plates 87 and 88 spaced apart by a predetermined distance are connected to an upper portion of the main chamber 2 to form a frame F. The lift rod 82 is inserted slidably through a tubular guide member 83 extending through the lower plate 88. The lift rod 82 has at its upper end a flange 82a projecting above the guide member 83. A control rod 85 having a control lever 84 at its upper end projecting beyond the upper plate 87 is in parallel with the lift rod 82 and is rotatably supported by the upper and lower plates 87, 88 of the frame F. A latch member 86 for the lift rod 82 is mounted on an intermediate portion of the control rod 85. The latch member 86 is L-shaped when seen in a plan view as shown in FIG. 10 and is formed at its opposite ends with approximately semicircular first fitting portion 86a and second fitting portion 86b one of which is fittable around the lift rod 82 when the member 86 is rotated about the axis of the control rod 85. The opening width of the fitting portions 86a, 86b is slightly larger than the outside diameter of the lift rod 82 but is smaller than the outside diameter of the flange 82a. The peripheral part of the first fitting portion 86a has a smaller vertical thickness than that of the second fitting portion 86b. Accordingly the amount of downward movement of the lift rod 82 is controlled by the fitting of the respective portions 86a, 86b to the outer periphery of the rod 82, with the engagement of the flange 82a thereof with these portions. While the fitting portions 86a, 86b of the latch member 86 are positioned on opposite sides of the lift rod 82 away therefrom (see FIG. 10), the lift rod 82, when descending, will not be engaged by the latch member 86 but lowers until the flange 82a comes into contact with the upper end of the guide member 83. Thus the amount of movement of the lift rod 82 is controlled in two steps by the engagement of the rod 82 with the first fitting portion 82a or the second fitting portion 82b of the latch member 86 and further otherwise by the rod 82 being out of engagement with the latch member 86, hence three-step control.

When the hydraulic cylinder 71 is operated, the shafts 72 are rotated through the first arm 73. This movement is delivered to the second arms 75 and then to the horizontal bars 74 to raise or lower the rails 6. The rails 6 are adjustable to three levels according to the kind of containers.

The interior of the main chamber is cleaned in the following manner when required, for example, on completion of a day's operation. While the units for packaging are held out of operation, the transport conveyor 3 is operated with a washing liquid forced out from the spray nozzles 51 and balls 52. Before or after this, the cleaning liquid is held to a depth for the conveyor to be immersed in the liquid, in the front deep portion of the main chamber 2 which portion serves as a washing liquid reservoir D. In this way, the machine can be cleaned as installed merely by spraying the washing liquid and idly driving the transport conveyor 3 without necessitating any other attendant work. Furthermore, the packaging operation comprising a sequence of processes is carried out entirely within the main chamber which is sealed off from the atmosphere and is therefore very hygienic.

I claim:

1. A packaging machine comprising:
    a container transport conveyor having a plurality of container holders for retaining containers, each container holder being adapted to restrain containers retained therein from moving horizontally while permitting vertical movement of the containers retained therein;
    a closed main chamber having opposite side walls and enclosing the container transport conveyor in its entirety;
    a closed rear chamber disposed in communication with the main chamber to the rear of the main chamber with respect to the running direction of the conveyor and enclosing the container forming-feeding unit in its entirety;
    a group of units, including at least a filling unit, a capping unit and a container discharge unit arranged in series on a top wall of the main chamber from a rear portion toward a front portion with respect to a running direction of the conveyor, the group of units having portions operative on containers and extending into the main chamber;
    at least one rail disposed below and parallel with an upper path of travel of the container holders for supporting the bottoms of the containers retained by the container holders and for guiding the containers, said at least one rails being movable upwardly and downwardly; and a rail lifting assembly for moving at least one rail, the rail lifting assembly comprising a hydraulic cylinder positioned laterally of the main chamber and provided with a piston rod, a rotary shaft extending transversely through the main chamber, supported by the opposite side walls of the main chamber and having one end projecting outward from the main chamber, a first arm having an upper end secured to the piston rod and a lower end pivoted to the projecting end of the rotary shaft and a plurality of second arms each having a lower end pivoted to the rotary shaft within the main chamber and an upper end secured to said rail.

2. A packaging machine as defined in claim 1 wherein rotary shafts are disposed at two locations longitudinally of said rail, the projecting ends of the rotary shafts being each secured to respective lower ends of a plurality of third arms disposed side by side with the first arm, the third arms being interconnected by a horizontal link.

3. A packaging machine as defined in claim 1 or 2 further comprising rail level adjusting means in operable association with the rail lifting means for adjustably setting the amount of movement of said rail by regulating the stroke of the piston rod, whereby at least one rail may be set to different levels for accommodating containers of different heights in the container holders.

4. A packaging machine as defined in claim 3 wherein the rail level adjusting means comprises a lift rod having a lower end secured to the first arm and a flange at its upper end, a tubular guide member fitted over the lift rod and fixed to a frame connected to an upper portion of the main chamber, a vertical control rod rotatably supported by the frame at a position laterally of the lift rod and having an upper end attached to a control lever, and a latch member fixed to the control rod and having at least one fitting portion with an opening therein having a width smaller than an outer diameter of the flange and larger than an outer diameter of the lift rod so that it fits around the lift rod when the latch member is rotated about the axis of the control rod.

5. A packaging machine as defined in claim 4 wherein the latch member is L-shaped when seen in a plan view, having a first and a second fitting portion being each disposed as opposed to each other on the opposite ends of the latch member, and with a peripheral part of the first fitting portion having a vertical thickness smaller than that of the second fitting portion.

* * * * *